(12) United States Patent
Sakai et al.

(10) Patent No.: US 9,513,862 B2
(45) Date of Patent: Dec. 6, 2016

(54) DETACHABLE MACHINE CONTROL PANEL WITH DISPLAY

(71) Applicant: FANUC Corporation, Yamanashi (JP)

(72) Inventors: Yutaka Sakai, Yamanashi (JP); Hiroshige Ando, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 115 days.

(21) Appl. No.: 14/618,259

(22) Filed: Feb. 10, 2015

(65) Prior Publication Data

US 2015/0234630 A1  Aug. 20, 2015

(30) Foreign Application Priority Data

Feb. 20, 2014  (JP) ................................ 2014-030994

(51) Int. Cl.
  *G06F 3/14* (2006.01)
  *G06F 3/041* (2006.01)
  *G05B 19/409* (2006.01)
  *G06T 3/60* (2006.01)

(52) U.S. Cl.
  CPC ........... *G06F 3/1423* (2013.01); *G05B 19/409* (2013.01); *G06F 3/041* (2013.01); *G05B 2219/36159* (2013.01); *G06T 3/60* (2013.01)

(58) Field of Classification Search
  None
  See application file for complete search history.

(56) References Cited

FOREIGN PATENT DOCUMENTS

| JP | 3-116405 U | 12/1991 |
|---|---|---|
| JP | 5-324037 A | 12/1993 |
| JP | 6-198541 A | 7/1994 |
| JP | 11-122723 A | 4/1999 |
| JP | 2009-193568 A | 8/2009 |
| JP | 2011-255472 A | 12/2011 |

OTHER PUBLICATIONS

Office Action mailed Jul. 21, 2015, corresponding to Japanese patent application No. 2014-030994.

*Primary Examiner* — Maurice L McDowell, Jr.
(74) *Attorney, Agent, or Firm* — Hauptman Ham, LLP (57) ABSTRACT

There is provided a machine control panel with a display connected to a numerical controller of a machine tool. A part of a display section and an operation section are detachable from a main body. When a detachable section configured from the part of the display section and the operation section is detached from the main body, the detachable section is usable as a portable control panel. On the other hand, in a state in which the detachable section is attached to the main body, the display section and another display section fixed to the main body are combined as one screen to perform display.

9 Claims, 9 Drawing Sheets

DETACHABLE MACHINE CONTROL PANEL WITH DISPLAY

RELATED APPLICATIONS

The present application claims priority to Japanese Application number 2014-030994, filed Feb. 20, 2014, the disclosure of which is hereby incorporated by reference herein in its entirety.

BACKGROUND OF THE INVENTION

1. Field of the Invention

The present invention relates to a machine control panel with a display and, more particularly, to a machine control panel with a display connected to a numerical controller of a machine tool.

2. Description of the Related Art

Conventionally, in numerical controllers that numerically control a machine tool, a control panel including switches, keys, and the like and a display for checking work content for creating and editing a machining program for machine tools and for performing selection and execution of an already-created machining program are provided. In general, the control panel and the display are attached to a power panel cabinet of the machine tool or an exclusive housing for attaching the control panel and the display is prepared and set in the vicinity of the machine tool.

In these numerical controllers, it is necessary to perform a test for checking whether the created machining program has an error or not. When the test is performed, in some case, movement of a tool is checked near a workpiece and, if there is a problem in the movement of the tool, editing work for the machining program is performed on the site. Consequently, since editing of the machining program can be quickly performed, convenience for an operator increases.

Japanese Patent Application Laid-open No. 6-198541 discloses a technique for providing, in a machine tool, a portable control panel including a display section. Japanese Utility Model Application Laid-open No. 3-116405 discloses a technique for making, in a numerical controller that performs control of a machine tool, an operation section thereof detachable and portable.

Concerning a display provided side by side with an installation-type control panel of a machine tool, machine tool manufacturers demand to clearly display various kinds of information. Therefore, an increase in the size of a screen is ongoing. On the other hand, to make a control panel including a display section portable, there is a limit in the size of the control panel when portability of the control panel is taken into account. The size of the display section cannot be designed so large.

Therefore, when the control panel itself is made portable as in the technique disclosed in Japanese. Utility Model Application Laid-open No. 3-116405 mentioned above, it is difficult to simultaneously meet the two demands for the increase in the size of the screen and the portability.

SUMMARY OF THE INVENTION

Therefore, it is an object of the present invention to provide a machine control panel with a display connected to a numerical controller of a machine tool, the machine control panel with the display satisfying both of an increase in the size of a screen of the display set in a main body of the control panel and portability of the display detached from the main body.

The machine control panel with the display according to the present invention performs exchange of data with the numerical controller that controls the machine tool. The machine control panel with the display is set in the machine tool or set in the vicinity of the machine tool in order to operate the machine tool.

In a first aspect of the machine control panel with the display, a main body of the machine control panel with the display includes: a first display section; a second display section disposed side by side with the first display section; and an operation section including a switch. The second display section and the operation section are integrally configured as a detachable section. The detachable section is configured to be detachable from the main body and attachable to the main body. In a state in which the detachable section is attached to the main body, the first display section and the second display section are combined as one screen to perform display.

In the machine control panel with the display in this aspect, in a state in which the display (the detachable section) is attached to the main body of the machine control panel with the display, display is performed on a large one screen formed by combining the first display section and the second display section. Consequently, a demand for an increase in the size of a screen can be satisfied. On the other hand, in a state in which the display (the detachable section) is detached from the main body of the machine control panel with the display, a display screen of the display is small. However, a demand for portability of the display can be satisfied.

When control panels of two types, i.e., an installation type and a portable type, are prepared and a machine tool is large and the two control panels of the installation type and the portable type are apart from each other, it is possible to solve a problem in that it is hard for an operator viewing one control panel to clearly grasp a state of use of the other control panel. Therefore, it is easy to grasp the state of use.

In the first display section and the second display section, congruent rectangles are disposed side by side on the left and right, with the long sides thereof set in contact with each other. The operation section is disposed on the opposite side of the first display section to the second display section. The shape of the screen formed by combining the first display section and the second display section is similar to the shape of a screen of the second display section. The main body of the machine control panel with the display can further include: a detector that detects detachment of the detachable section from the main body; and a memory that stores image data for performing, when the detachable section is detached from the main body and rotated 90 degrees from a set state in the main body to be set in a direction in which the operation section is on the lower side of the second display section, on the second display section, display reduced at the same rate longitudinally and laterally with respect to screen display in a state in which the first display section and the second display section are disposed side by side on the right and left. The main body may further include an image processing unit that performs a reduction or the reduction and rotation of the image data. Alternatively, image processing for performing the reduction or the reduction and the rotation of the data may be performed in the numerical controller connected to the machine control panel with the display.

In this embodiment, the screen during carrying is only displayed by rotating the screen during setting 90 degrees and reducing the screen. Therefore, it is unnecessary to prepare a new screen configuration. Since display panels of the same size are used, it is easy to procure components. The image processing such as the reduction and the rotation of the image data is performed in the numerical controller to which the machine control panel with the display is connected. Consequently, since an image processing circuit is unnecessary on the side of the machine control panel with the display, it is possible to reduce costs.

The main body of the machine control panel with the display can further include an operation section rotating mechanism that rotates the operation section 90 degrees.

In a second aspect of the machine control panel with the display, a main body of the machine control panel with the display includes: a first display section; a second display section disposed side by side with the first display section; and an operation section including a switch. The second display section is detachable from the main body and attachable to the main body. Moreover, the second display section is configured by a touch panel. A switch disposed unit, in which switches configured by the touch panel are disposed in a part of the second display section to enable the switches to be used as the operation section, is provided in the second display section.

In the machine control panel with the display in this aspect, a part (the second display section) of a display section can be detached from the main body and used as the operation section. On the other hand, when the display section (the first display section and the second display section) is set in a control panel main body, the display section can be viewed as a large screen formed by combining the first display section and the second display section.

In the first display section and the second display section, congruent rectangles are disposed side by side, with the long sides thereof set in contact with each other. The shape of a screen formed by combining the first display section and the second display section is similar to a region used for screen display of the second display section. The switch disposed unit, in which the switches are disposed, is provided in the second display section. The main body of the machine control panel with the display can further include: a detector that detects detachment of the second display section from the main body; and a memory that stores image data for performing, when the second display section is detached from the main body and used such that the long side thereof is set in a longitudinal direction, on the second display section, display reduced at the same rate longitudinally and laterally with respect to screen display in a state in which the first display section and the second display section are disposed side by side. The main body may further include an image processing unit that performs a reduction or the reduction and rotation of the image data. Alternatively, image processing for performing the reduction or the reduction and the rotation of the data may be performed in the numerical controller connected to the machine control panel with the display.

In this embodiment, the screen during carrying is only displayed by reducing or reducing and rotating the screen during setting. Therefore, it is unnecessary to prepare a new screen configuration. Since display panels of the same size are used, it is easy to procure components. The image processing such as the reduction and the rotation of the image data is performed in the numerical controller to which the machine control panel with the display is connected. Consequently, since an image processing circuit is unnecessary on the side of the machine control panel with the display, it is possible to reduce costs.

The main body of the machine control panel with the display may further include a detector that detects detachment of the second display section. When detecting the detachment of the second display section, the detector may transmit a signal for limiting the speed of a spindle or a feed axis of the machine tool to the numerical controller.

According to the present invention, it is possible to provide the machine control panel with the display connected to the numerical controller of the machine tool, the machine control panel with the display satisfying both of an increase in the size of the screen during setting in the main body of the control panel and portability during detachment.

BRIEF DESCRIPTION OF THE DRAWINGS

The above and other objects and features of the present invention will be made apparent from the following explanation of embodiments with reference to the accompanying drawings. Among the drawings.

DESCRIPTION OF THE PREFERRED EMBODIMENTS

First, a machine control panel with a display according to a first embodiment of the present invention is explained with reference to FIGS. 1 to 4.

Figure 1:
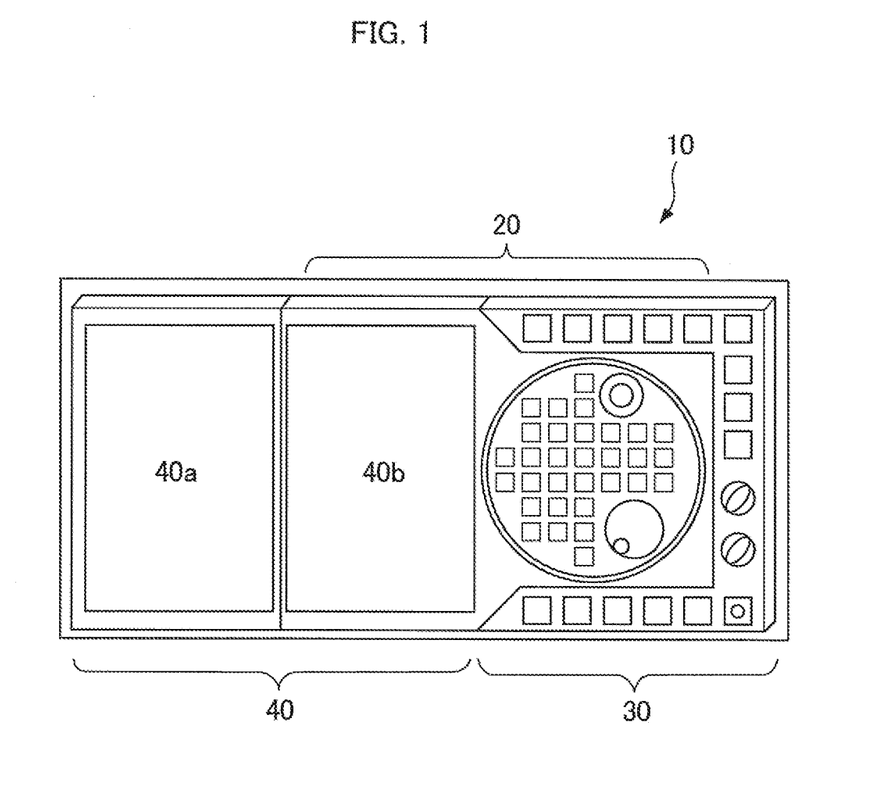
FIG. 1 is a diagram for explaining a machine control panel with a display according a first embodiment of the present invention.

A machine control panel with a display 10 according to this embodiment includes, as shown in FIG. 1, an operation section 30 and a display section 40 disposed side by side with the operation section 30. The display section 40 is configured from two LCD panels having the same size, i.e., a first display section 40a and a second display section 40b.

Figure 2:
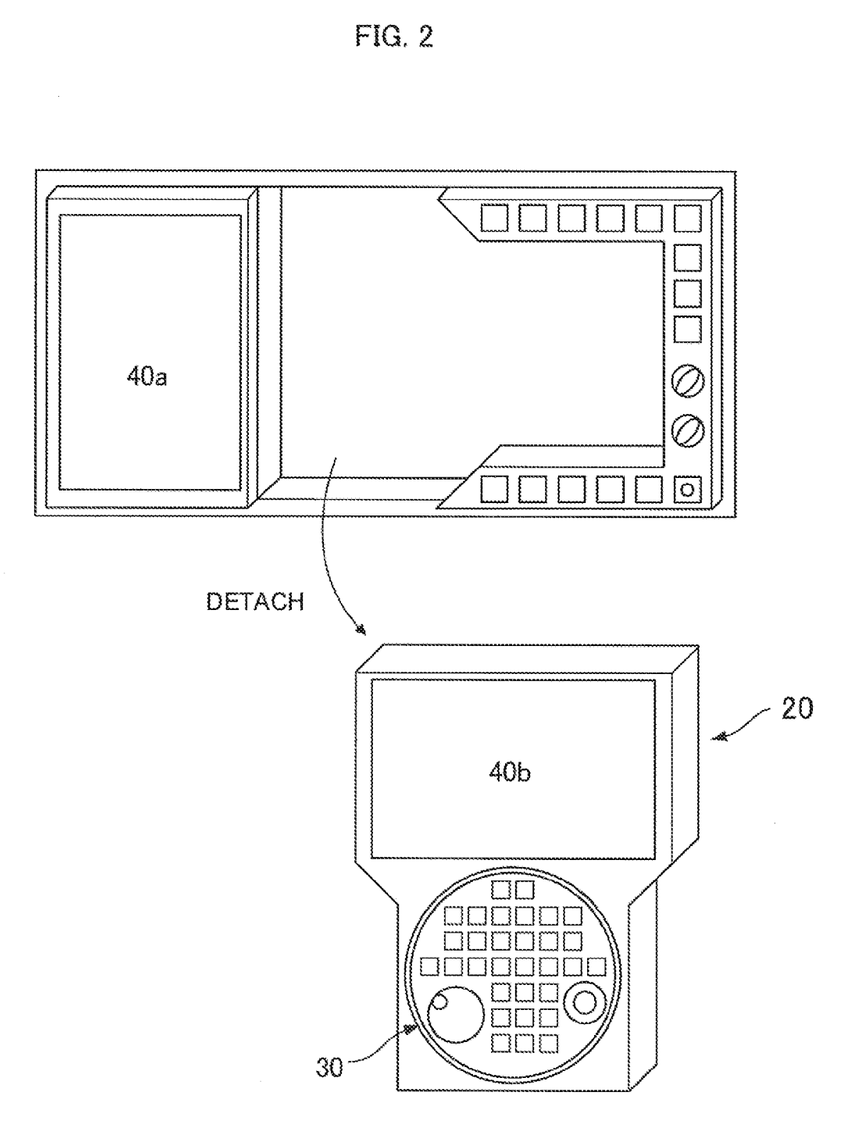
FIG. 2 is a diagram showing a state in which a detachable section is detached from a main body of the machine control panel with the display shown in FIG. 1.

The first display section 40a and the second display section 40b are disposed side by side on the left and right such that the long sides of the respective panels are in contact with each other as shown in FIG. 1. The first display section 40a is fixed to a main body (a control panel main body) of the machine control panel with the display 10. On the other hand, the second display section 40b configures a detachable section 20 in conjunction with a part of the operation section 30. As shown in FIG. 2, the second display section 40b is configured to be detachable from the control panel main body together with the operation section 30. When detached from the control panel main body, the detachable section 20 is usable as a control panel of a portable type. Note that, in this embodiment, a part of the operation section 30 is detachable (i.e., a part of the operation section 30 is included in the detachable section 20). However, it is also possible to configure the entire operation section 30 to be detachable (the entire operation section 30 is included in the detachable section 20).

In a state in which the detachable section 20 is attached to the control panel main body as shown in FIG. 1, the first display section 40a and the second display section 40b are combined as one screen to perform display. On the other hand, when the detachable section 20 is detached from the control panel main body and used as a control panel of a portable type, as shown in FIG. 2, the detachable section 20 is rotated 90 degrees from a direction during attachment to the control panel main body and used.

In both of the first display section 40a and the second display section 40b configuring the display section 40, the length of the long side is root two times as large as the length of the short side. Therefore, a screen obtained when the first display section 40a and the second display section 40b are combined as one screen is similar to a screen of the control panel of the portable type. As shown in FIG. 2, when the detachable section 20 is detached from the control panel main body and used as the control panel of the portable type, the detachable section 20 is rotated 90 degrees and used. Therefore, a ratio of the short side and the long side of the display screen is equal during attachment to the control panel main body and during detachment from the control panel main body.

The control section 30 of the detachable section 20 has a configuration in which a plurality of switches are disposed on the upper surface of a disc-like rotating section. As indicated by an arrow in FIG. 3A, the operation section 30 rotates 90 degrees from a posture shown in FIG. 3A to a posture shown in FIG. 3B.

Figure 3A:
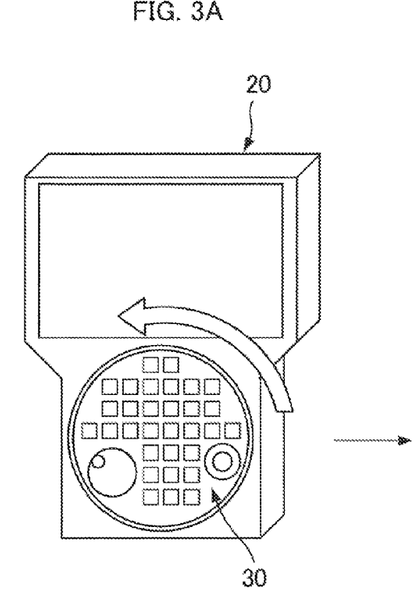
FIGS. 3A and 3B are diagrams showing a state in which an operation section of the detachable section shown in FIG. 2 rotates 90 degrees from a posture shown in FIG. 3A to a posture shown in FIG. 3B.
Figure 3B:
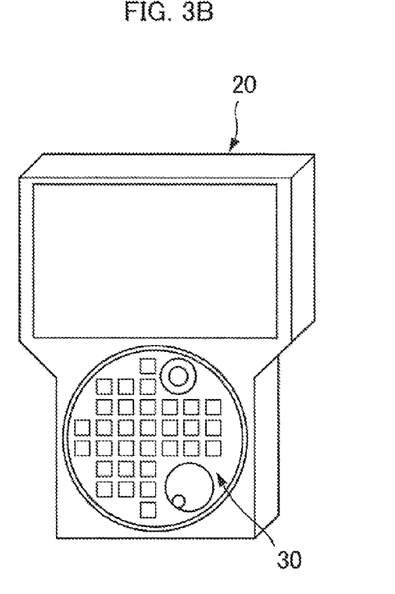
Figure 3C:
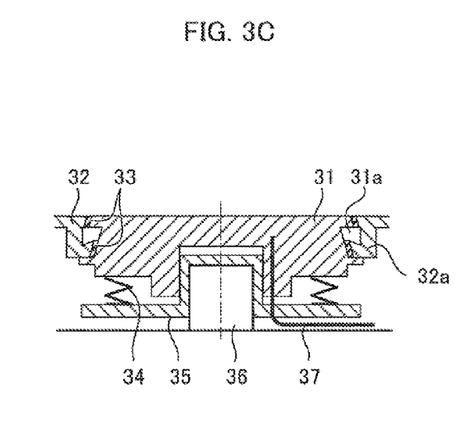
FIGS. 3C and 3D are diagrams for explaining a rotation mechanism of a rotation operation section in the operation section shown in FIGS. 3A and 3B.
Figure 3D:
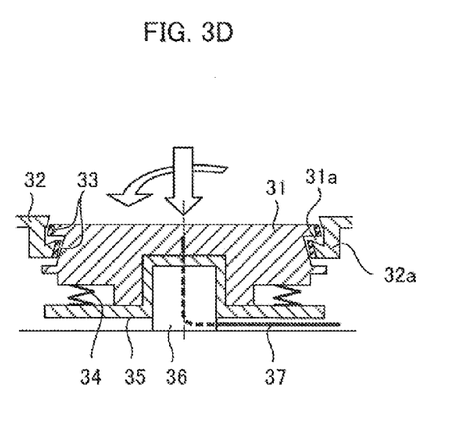

FIGS. 3C and 3D are diagrams for explaining a rotation mechanism of a rotation operation section 31 in the operation section 30. As shown in FIGS. 3C and 3D, the rotation operation section 31 is rotatably fit in a rotating shaft 36 in substantially the center of a case 32. A groove 31a having certain depth is formed along the entire circumference at an outer circumferential end edge of the rotation operation section 31. A bent section 32a formed at an end of the case 32 opposed to the rotation operation section 31 enters the circumferential groove 31a.

FIG. 3C shows the rotation opera on section 31 in a normal state (not pressed). The inner side end portion of the case 32 and the outer side end portion of the rotation operation section 31 keep a state in which the inner side end portion and the outer side end portion are in contact with and combined with each other across a gasket 33. Therefore, in this state, rotation of the rotation operation section 31 with respect to the case 32 is restrained. A rotating plate 35 is rotatably fit in the rotating shaft 36 below the rotation operation section 31. The rotation operation section 31 and the rotating plate 35 are coupled by a spring 34. Reference numeral 37 denotes a cable that transmits a signal of a switch input of the rotation operation section 31 to the outside.

When an operator presses down the rotation operation section 31 shown in FIG. 3C by hand, as shown in FIG. 3D, the state in which the inner side end portion of the case 32 and the outer side end portion of the rotation operation section 31 are combined with each other across the gasket 33 is released. The spring 34 contracts and the rotation operation section 31 and the rotating plate 35 come into contact with each other, whereby the rotation operation section 31 becomes rotatable. In this state, the rotation operation section 31 is rotated 90 degrees to make it easy to use the operation section 30 during carrying. After the rotation, when the pressed state is released, the rotation operation section 31 returns to the state shown in FIG. 3C with the elastic force of the spring 34.

Figure 4:
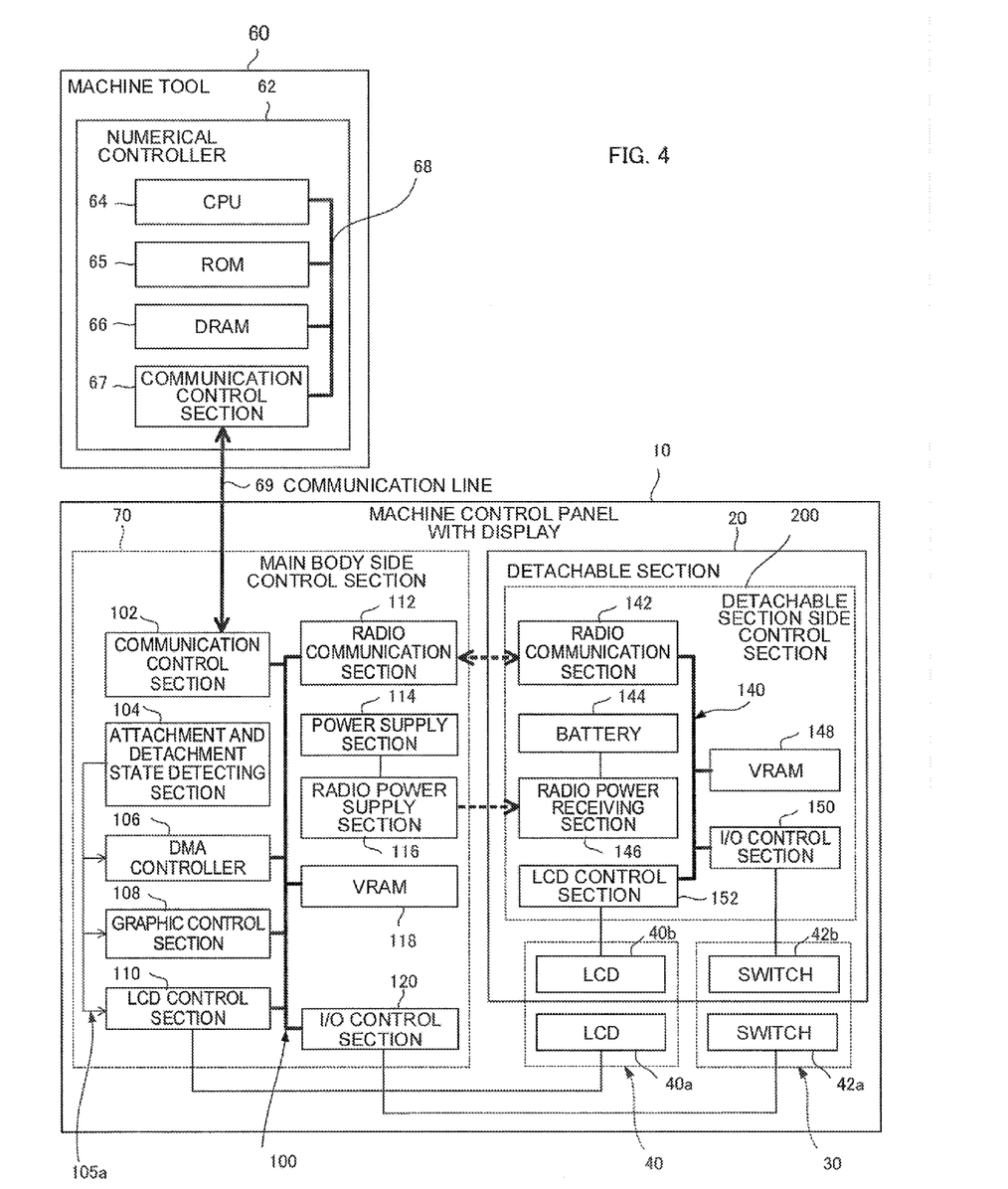
FIG. 4 is a block diagram showing a relation between the machine control panel shown in FIG. 1 and a numerical controller of a machine tool to which the machine control panel is connected.

FIG. 4 is a block diagram showing a relation between the machine control panel with the display 10 shown in FIG. 1 and a numerical controller 62 of a machine tool 60 to which the machine control panel 10 is connected.

The numerical controller 62 is provided on the inside of the machine tool 60. A CPU 64, a ROM 65, a DRAM 66, and a communication control section 67 are provided on the inside of the numerical controller 62 and are connected to one another by a bus 68. The communication control section 67 and a communication control section 102 in the machine control panel with the display 10 are connected by a communication line 69 and exchange signals.

The inside of the machine control panel with the display 10 is mainly configured from a main body side control section 70 and the detachable section 20.

The main body side control section 70 includes a communication control section 102, an attachment and detachment state detecting section 104, a DMA controller 106, a graphic control section 108, an LCD control section 110, a radio communication section 112, a power supply section 114, a radio power supply section 116, a VRAM 118, and an I/O control section 120. The communication control section 102, the DMA controller 106, the graphic control section 108, the LCD control section 110, the radio communication section 112, the VRAM 118, and the I/O communication section 120 are connected to one another by a bus 100. The LCD control section 110 is connected to a first display section 40a (an LCD) fixed to the control panel main body side.

The attachment and detachment state detecting section 104 is connected to the DMA controller 106, the graphic control section 108, and the LCD control section 110 by a signal line 105a. The I/O control section 120 is connected to a switch 42a fixed to the main body side. The radio communication section 112 performs, through radio communication, exchange of data with a radio communication section 142 on the detachable section side which is explained below. The radio power supply section 116 supplies, by radio, electric power to a radio power receiving section 146 on the detachable section side which is explained below.

On the other hand, a detachable section side control section 200 is provided on the inside of the detachable section 20. A radio communication section 142, a VRAM 148, an I/O control section 150, and an LCD control section 152 are provided on the inside of the detachable section side control section 200 and are connected to one another by a bus 140. Further, a battery 144 and radio power-receiving section 146 are provided in the control section 200. The LCD control section 152 is connected to the second display section 40b on the detachable section side. The I/O control section 150 is connected to a switch 42b on the detachable section side.

The CPU 64 in the numerical controller 62 controls a main body of the numerical controller 62 according to a program stored in the ROM 65. Further, the CPU 64 accesses, according to the program stored in the ROM 65, the graphic control section 108 in the main body side control section 70 via the communication line 69 and issues a command for creating screen data.

The attachment and detachment state detecting section 104 in the main body side control section 70 detects a state of attachment and detachment of the detachable section 20 to and from the control panel main body and notifies the DMA controller 106, the graphic control section 108, and the LCD control section 110 of the attachment and detachment state.

The graphic control section 108 creates screen data according to the command issued from the CPU 64. In creating the screen data, when the detachable section 20 is attached and a signal to that effect is input from the attachment and detachment state detecting section 104, the graphic control section 108 writes, in the VRAM 118, screen data for two display sections, i.e., the first display section 40a and the second display section 40b. When the detachable section 20 is detached from the control panel main body and a signal to that effect is input from the attachment and detachment state detecting section 104, the graphic control section 108 writes screen data for one display section in the VRAM 118 of the main body side control section 70.

When the detachable section 20 is detached from the control panel main body, the DMA controller 106 of the main body side control section 70 periodically transfers the screen data for the one display section from the VRAM 118 of the main body side control section 70 to the VRAM 148 of the detachable section side control section 200. On the other hand, when the detachable section 20 is attached to the control panel main body, the DMA controller 106 of the main body side control section 70 periodically transfers screen data for one LCD displayed on the detachable section side, among the screen data for the two display sections, from the VRAM 118 of the main body side control section 70 to the VRAM 148 of the detachable section side control section 200.

Only when the detachable section 20 is attached to the control panel main body, the LCD control section 110 of the main body side control section 70 sends, to the first display section 40a, screen data for one display section to be displayed on the first display section 40a on the main body side, among the screen data for the two display sections on the VRAM 118 of the main body side control section 70. On the other hand, when the detachable section 20 is detached from the control panel main body, the LCD control section 110 does not send screen data to the first display section 40a.

The LCD control section 152 of the detachable section side control section 200 sends a signal to the second display section 40b using the screen data sent from the main body side control section 70 present on the VRAM 148 of the detachable section side control section 200.

The DMA controller 106 on the main body control section 70 side periodically transfers data indicating states of the switches 42, which are respectively connected to the I/O control section 120 of the main body side control section 70 and the I/O control section 150 of the detachable section side control section 200, from the respective I/O control sections 120 and 150 to the DRAM 66 of the numerical controller 62. In transferring the data, the DMA controller 106 transfers data of I/O of the I/O control section 120 of the main body side control section 70 to an I/O region on the main body side in the DRAM 66 and transfers data of the I/O control section 150 of the detachable section side control section 200 to an I/O region for the detachable section side in the DRAM 66.

When the detachable section 20 is detached from the control panel main body, the DMA controller 106 transfers data of all 0's instead of the data of the I/O control section 120 of the main body side control section 70.

The CPU 64 reflects the data indicating the states of the switches 42 on control of a connected machine and screen display of the display section 40.

Concerning power supply to the detachable section side, when the detachable section 20 is attached to the control panel main body, the radio power supply section 116 on the main body side and the radio power receiving section 146 on the detachable section side are contiguous with each other. Power supply by radio is performed from the control panel main body side to the detachable section side. In this case, the radio power receiving section 146 on the detachable section side also performs charging in a battery 144. Conversely, when the detachable section 20 is detached from the control panel main body, power supply is performed from the battery 144.

A machine control panel with a display according to a second embodiment of the present invention is explained with reference to FIGS. 5 to 7.

Figure 5:
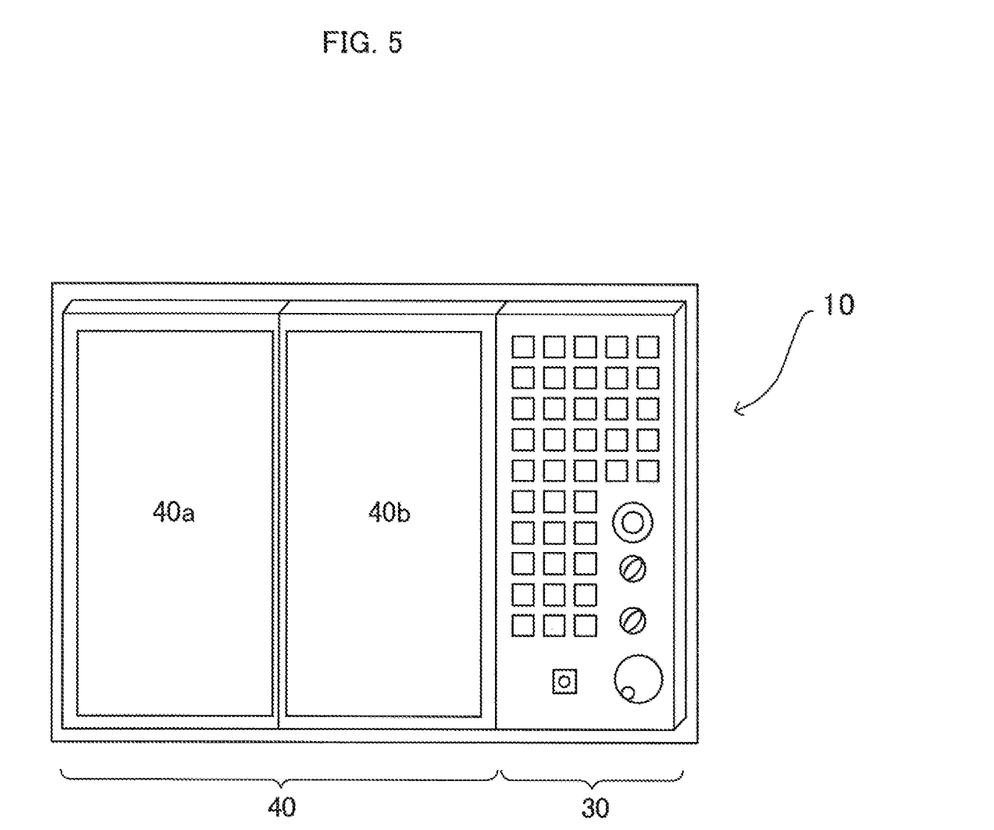
FIG. 5 is a diagram for explaining a machine control panel with a display according to a second embodiment of the present invention.
Figure 6A:
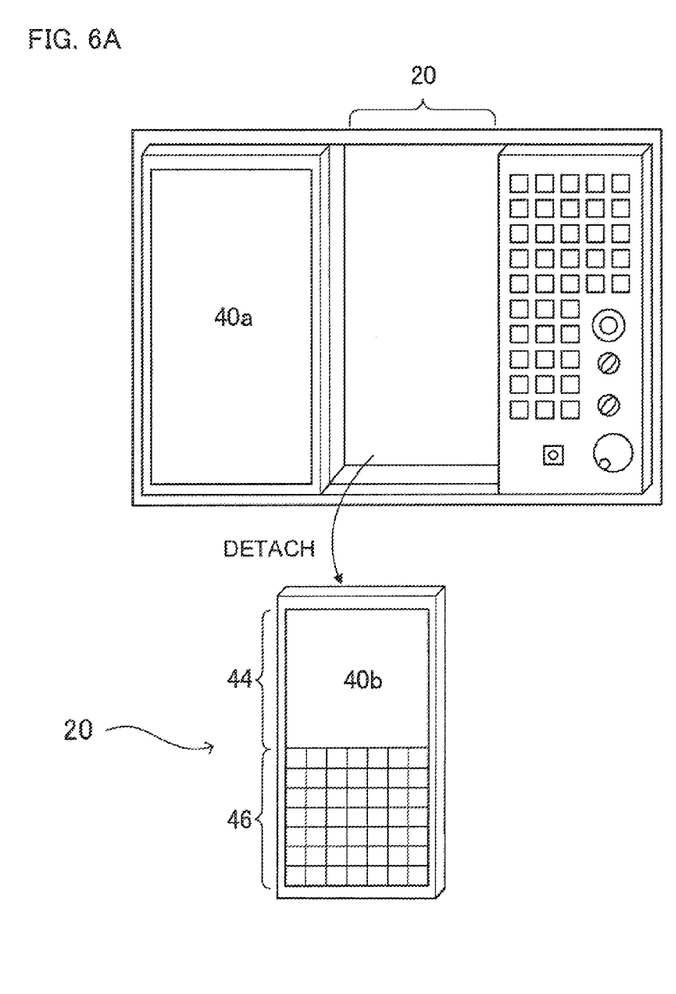
FIG. 6A is a diagram showing a state in which a detachable section is detached from a main body of the machine control panel with the display shown in FIG. 5.

The machine control panel with the display 10 according to this embodiment includes, as shown in FIG. 5, the operation section 30 and the display section 40 disposed side by side with the operation section 30. The display section 40 is configured from two LCD panels having the same size, i.e., the first display section 40a and the second display section 40b.

The first display section 40a and the second display section 40b are disposed side by side on the left and right such that the long sides of the respective panels are in contact with each other as shown in FIG. 5. The first display section 40a is fixed to a main body (a control panel main body) of the machine control panel with the display 10. On the other hand, the second display section 40b is configured to be independently detachable from the control panel main body as shown in FIG. 6A in a state in which the second display section 40b is connected to the detachable section 20.

In a state in which the detachable section 20 including the second display section 40b is attached to the control panel main body, as shown in FIG. 5, the first display section 40a and the second display section 40b are combined as one screen to perform display. On the other hand, when the detachable section 20 including the second display section 40b is detached from the control panel main body, as shown in FIG. 6A, a part of the second display section 40b connected to the detached detachable section 20 functions as a display section 44. An operation section 46 by a touch panel is disposed in the remaining portion and functions as a control panel of a portable type.

Figure 6B:
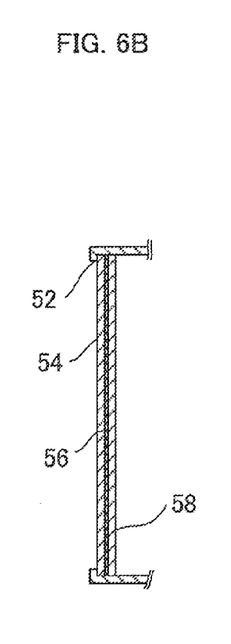
FIG. 6B is a sectional view of a second display section in the detachable section detached from the main body of the machine control panel with the display shown in FIG. 5.

In the second display section 40b detached from the control panel main body, as shown in a sectional view of FIG. 6B, like a normal touch panel, a touch panel 54 is disposed on the surface of an LCD 58, and the LCD 58 and the touch panel 54 are combined and fixed by a frame 52. Note that reference numeral 56 denotes a touch panel support.

Figure 7:
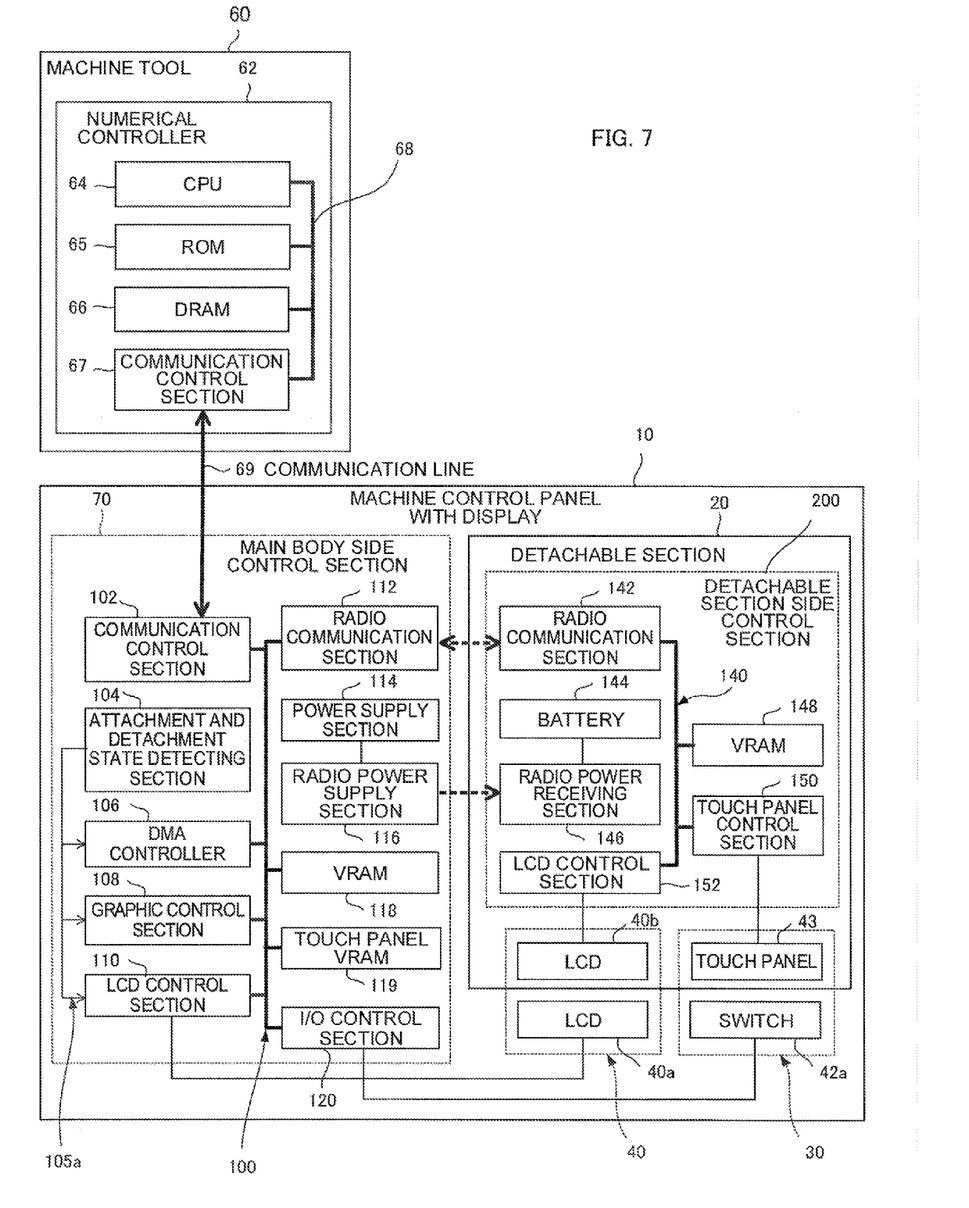
FIG. 7 is a block diagram showing the machine control panel with the display shown in FIG. 5 and a numerical controller of a machine tool to which the machine control panel is connected.

FIG. 7 is a block diagram showing a relation between the machine control panel with the display 10 shown in FIG. 5 and the numerical controller 62 of the machine tool 60 to which the machine control panel 10 is connected. In the figure, components same as the components of the block diagram in the first embodiment shown in FIG. 4 are denoted by the same names and explanation of the components is omitted.

In this embodiment, a touch panel VRAM 119 is provided in the main body side control section 70 and connected to the bus 100 that connects the communication control section 102, the LCD control section 110, the I/O control section 120, and the like. A touch panel control section 150 is provided in the detachable section 20 and connected to the detachable second display section 40b (a touch panel 43).

The CPU 64 of the numerical controller 62 sends, to the graphic control section 108, a command for causing the graphic control section 103 to create screen data for a half of a panel to be used when the detachable section 20 is detached, in which switches for the operation section 46 are arranged, on the touch panel 43 of the second operation section 40b, at the time of startup. The graphic control section 108 creates the screen data of the half of the panel based on the command from the CPU 64 of the numerical controller 62 and writes the screen data in the touch panel VRAM 119 in advance.

The graphic control section 108 creates screen data according to the command issued from the CPU 64 of the numerical controller 62. In creating the screen data, when the detachable section 20 (the second display section 40b) is attached to the control panel main body, the graphic control section 108 writes, in the VRAM 118 of the main body side control section 70, screen data for two panels formed by the first display section 40a and the second display section 40b. On the other hand, when the detachable section 20 (the second display section 40b) is detached from the control panel main body, the graphic control section 108 reduces the screen data for the two panels to the screen data for the half of the panel and writes the screen data in the VRAM 118 of the main body side control section 70.

When the detachable section 20 (the second display section 40b) is detached from the control panel main body, the DMA controller 106 periodically transfers, to the VRAM 148 of the detachable section side control section 200, the screen data for the half of the panel from the VRAM 118 and the screen data for the remaining half of the panel, in which the switches are arranged, from the VRAM 119. The touch panel control section 150 of the detachable section side control section 200 performs control of the touch panel 43 and, when the operator touches the screen on which the switches are arranged, acquires coordinate data on the screen of a touched position.

When the detachable section 20 (the second display section 40b) is attached to the control panel main body, the DMA controller 106 on the main body control section side transfers data of the I/O control section 120 of the main body side control section 70 to an I/O region (not shown in the figure) for the control panel main body side in the DRAM 66 of the numerical controller 62. On the other hand, when the detachable section 20 is detached from the control panel main body, the DMA controller 106 on the main body control section side transfers the coordinate data of the touched position of the touch panel control section 150 of the detachable section side control section 200 to an I/O region (not shown in the figure) for the detachable section side in the DRAM 66 of the numerical controller 62.

Further, when the detachable section 20 (the second display section 40b) is detached from the control panel main body, the DMA controller 106 on the main body control section side transfers data of all 0's to an I/O region (not shown in the figure) for the main body side in the DRAM 66 of the numerical controller 62. Data of 1 is always separately prepared in the data of the I/O control section 120 of the main body side control section 70. The CPU 64 of the numerical controller 62 reads data in a place to which 1 is always transferred in the DRAM 66. If the data is 1, the CPU 64 determines that the detachable section 20 is attached to the control panel main body. Otherwise, the CPU 64 determines that the detachable section 20 is detached from the control panel main body. When determining that the detachable section 20 is detached from the control panel main body, the CPU 64 determines, from coordinate data in the I/O region (not shown in the figure) for the detachable section side in the DRAM 66, which of the switches is pressed.

A machine control panel with a display according to a third embodiment of the present invention is explained with reference to FIG. 8.

Figure 8:
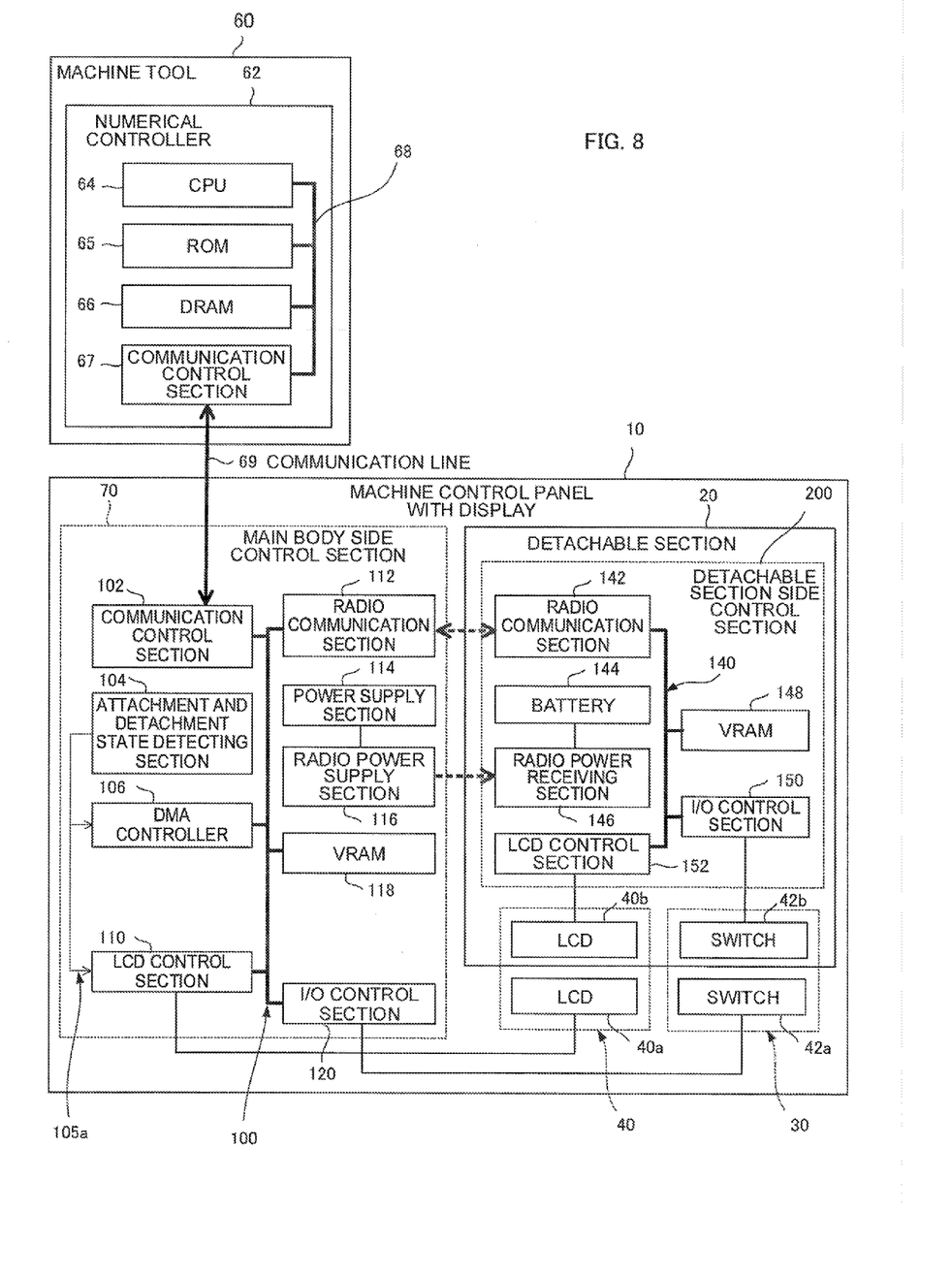
FIG. 8 is a block diagram showing a relation between a machine control panel with a display according to a third embodiment of the present invention and a numerical controller of a machine tool to which the machine control and is connected.

FIG. 8 is a block diagram showing the machine control panel with the display 10 according to the third embodiment of the present invention and the numerical controller 62 of the machine tool 60 to which the machine control panel 10 is connected. In the figure, components same as the components in the block diagram in the first embodiment shown in FIG. 4 are denoted by the same names and explanation of the components is omitted.

In this embodiment, the graphic control section 108 in the main body side control section 70 in the first embodiment is omitted. Creation of image data performed by the graphic control section 108 in the first embodiment is performed by the CPU 64 of the numerical controller 62. The image data is written in the DRAM 66. The DMA controller 106 of the main body side control section 70 transfers the image data written in the DRAM 66 of the numerical controller 62 to the VRAM 118 of the main body side control section 70 and the VRAM 148 of the detachable section side control section 200.

In this embodiment, as in the second embodiment, data of 1 is always separately prepared in the data of the I/O control section 120 of the main body side control section 70. When the detachable section 20 is detached from the control panel main body, the DMA controller 106 of the main body side control section 70 transfers data of all 0's to the DRAM 66 of the numerical controller 62 without transferring the data of the I/O control section 120 of the main body side control section 70. Consequently, the CPU 64 of the numerical controller 62 reads data in a place to which 1 is always transferred in the DRAM 66. If the data is 1, the CPU 64 determines that the detachable section 20 is attached to the control panel main body. Otherwise, the CPU 64 determines that the detachable section 20 is detached from the control panel main body. The CPU 64 creates, on the basis of this information, screen data adjusted to a state of the detachable section 20.

A machine control panel with a display according to a fourth embodiment of the present invention is explained with reference to FIG. 9.

Figure 9:
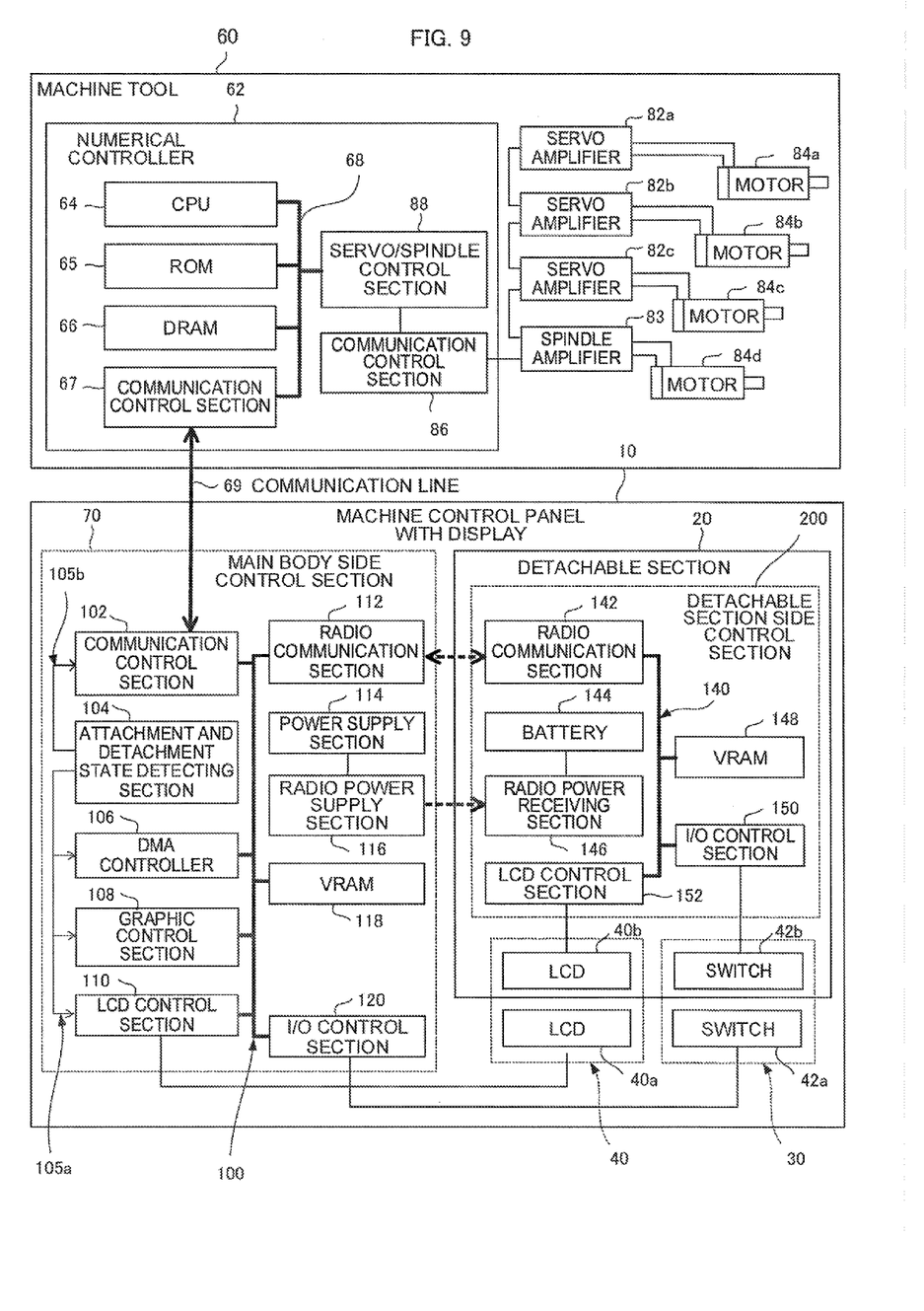
FIG. 9 is a block diagram showing a relation between a machine control panel with a display according to a fourth embodiment of the present invention and a numerical controller of a machine tool to which the machine control panel is connected.

FIG. 9 is a block diagram showing the machine control panel with the display 10 according to the fourth embodiment of the present invention and the numerical controller 62 of the machine tool 60 to which the machine control panel 10 is connected. In the figure, components same as the components in the block diagram in the first embodiment shown in FIG. 4 are denoted by the same names and explanation of the components is omitted.

The machine tool 60 includes servo motors 84a, 84b, and 84c that drive feed axes and a spindle motor 84d that drives a spindle. Servo amplifiers 82a, 82b, and 82c and a spindle amplifier 83, configured by inverters and the like, functioning as driving power supply for the motors are provided. The servo amplifiers 82a, 82b, and 82c and the spindle amplifiers 83 are connected to a communication control section 86 in a daisy-chain system. A servo/spindle control section 88 performs feedback control of the positions and the speeds of the servo motors 84a, 84b, and 84c, speed control of the spindle motor 84d, and the like. The servo/spindle control section 88 is connected to the CPU 64, the ROM 65, the DRAM 66, and the communication control section 67 by a bus in the numerical controller 62. The servo/spindle control section 88 gives commands to the servo amplifiers 82a, 82b, and 82c and the spindle amplifier 83 via the communication control section 86.

When detecting that the detachable section 20 is detached from the control panel main body, the attachment and detachment state detecting section 104 of the main body side control section 70 notifies the communication control section 102 of the main body side control section 70 to that effect via a signal line 105b. The communication control section 102 receives the notification and preferentially communicates this information to the communication control section 67 of the numerical controller 62. The communication control section 67 of the numerical controller 62 receives the preferential communication and causes an interrupt to the CPU 64 via an interrupt signal line 63. By receiving the interrupt, the CPU 64 commands the servo/spindle control section 88 to perform speed control of the servo motors 84a, 84b, and 84c and the spindle motor 84d.

Note that, in these embodiments, exchange of data between the detachable section 20 and the main body side control section 70 is performed using radio communication. However, the exchange of data can also be performed by wired communication. Instead of communicating with the main body side control section 70, the detachable section 20 can also directly communicate with the numerical controller 62.

What is claimed is:

1. A machine control panel with a display that performs exchange of data with a numerical controller that controls a machine tool, the machine control panel with the display being set in the machine tool or set in a vicinity of the machine tool in order to operate the machine tool, wherein
a main body of the machine control panel with the display includes:
a first display section;
a second display section disposed side by side with the first display section; and
an operation section including a switch, and wherein
the second display section and the operation section are integrally configured as a detachable section,
the detachable section is configured to be detachable from the main body and attachable to the main body, and
in a state in which the detachable section is attached to the main body, the first display section and the second display section are combined as one screen to perform display.

2. The machine control panel with the display according to claim 1, wherein
in the first display section and the second display section, congruent rectangles are disposed side by side on left and right, with long sides thereof set in contact with each other,
the operation section is disposed on an opposite side of the first display section to the second display section,
a shape of the screen formed by combining the first display section and the second display section is similar to a shape of a screen of the second display section, and
the main body of the machine control panel with the display further includes:
a detector that detects detachment of the detachable section from the main body;
a memory that stores image data for performing, when the detachable section is detached from the main body and rotated 90 degrees from a set state in the main body to be set in a direction in which the operation section is on a lower side of the second display section, on the second display section, display reduced at a same rate longitudinally and laterally with respect to screen display in a state in which the first display section and the second display section are disposed side by side on the right and left; and
an image processing unit that performs a reduction, or the reduction and rotation of the image data.

3. The machine control panel with the display according to claim 2, wherein, when detecting the detachment of the second display section, the detector transmits a signal for limiting speed of a spindle or a feed axis of the machine tool to the numerical controller.

4. The machine control panel with the display according to claim 1, wherein
in the first display section and the second display section, congruent rectangles are disposed side by side on left and right, with long sides thereof set in contact with each other,
the operation section is disposed on an opposite side of the first display section to the second display section,
a shape of the screen formed by combining the first display section and the second display section is similar to a shape of a screen of the second display section, and
the main body of the machine control panel with the display further includes:
a detector that detects detachment of the detachable section from the main body; and
a memory that stores image data for performing, when the detachable section is detached from the main body and rotated 90 degrees from a set state in the main body to be set in a direction in which the operation section is on a lower side of the second display section, on the second display section, display reduced at a same rate longitudinally and laterally with respect to screen display in a state in which the first display section and the second display section are disposed side by side on the right and left, and wherein
image processing for performing the reduction, or the reduction and the rotation of the data is performed in the numerical controller connected to the machine control panel with the display.

5. The machine control panel with the display according to claim 1, wherein the main body of the machine control panel with the display further includes an operation section rotating mechanism that rotates the operation section 90 degrees.

6. The machine control panel with the display according to claim 1, wherein
the main body of the machine control panel with the display further includes a detector that detects detachment of the second display section, and
when detecting the detachment of the second display section, the detector transmits a signal for limiting speed of a spindle or a feed axis of the machine tool to the numerical controller.

7. A machine control panel with a display that performs exchange of data with a numerical controller that controls a machine tool, the machine control panel with the display being set in the machine tool or set in a vicinity of the machine tool in order to operate the machine tool, wherein
a main body of the machine control panel with the display includes:
a first display section;
a second display section disposed side by side with the first display section; and
an operation section including a switch, and wherein
the second display section is detachable from the main body and attachable to the main body,
the second display section is configured by a touch panel, and
a switch disposed unit, in which switches configured by the touch panel are disposed in a part of the second display section to enable the switches to be used as the operation section, is provided in the second display section.

8. The machine control panel with the display according to claim 7, wherein
in the first display section and the second display section, congruent rectangles are disposed side by side, with long sides thereof set in contact with each other,
a shape of a screen formed by combining the first display section and the second display section is similar to a region used for screen display of the second display section,
a switch disposed unit, in which the switches are disposed, is provided in the second display section, and
the main body of the machine control panel with the display further includes:
a detector that detects detachment of the second display section from the main body;
a memory that stores image data for performing, when the second display section is detached from the main body and used such that the long side thereof is set in a longitudinal direction, on the second display section, display reduced at a same rate longitudinally and laterally with respect to screen display in a state in which the first display section and the second display section are disposed side by side; and
an image processing unit that performs a reduction, or the reduction and rotation of the image data.

9. The machine control panel with the display according to claim 7, wherein
in the first display section and the second display section, congruent rectangles are disposed side by side, with long sides thereof set in contact with each other,
a shape of a screen formed by combining the first display section and the second display section is similar to a region used for screen display of the second display section,
a switch disposed unit, in which the switches are disposed, is provided in the second display section, and
the main body of the machine control panel with the display further includes:
a detector that detects detachment of the second display section from the main body; and
a memory that stores image data for performing, when the second display section is detached from the main body and used such that the long side thereof is set in a longitudinal direction, on the second display section, display reduced at a same rate longitudinally and laterally with respect to screen display in a state in which the first display section and the second display section are disposed side by side, and wherein
image processing for performing the reduction, or the reduction and the rotation of the data is performed in the numerical controller connected to the machine control panel with the display.

* * * * *